United States Patent [19]

Pollara et al.

[11] Patent Number: 4,612,026
[45] Date of Patent: Sep. 16, 1986

[54] AIR TREATMENT UNIT PROVIDING A FILTRATION SYSTEM FOR REMOVING ETHYLENE OXIDE FROM A CONTAMINATED ENVIRONMENT

[76] Inventors: Frank J. Pollara, 240 E. Pierrepont Ave., Rutherford, N.J. 07070; Louis W. Liddle, 117 Livingston St., Clifton, N.J. 07013

[21] Appl. No.: 788,847
[22] Filed: Oct. 18, 1985
[51] Int. Cl.⁴ ............... B01D 53/02; G01N 21/78
[52] U.S. Cl. ................................. 55/274; 55/279; 55/316
[58] Field of Search ............ 55/274, 279, 316, 387; 98/2.11; 422/88, 171; 436/1, 93, 178

[56] References Cited

U.S. PATENT DOCUMENTS

| | | | |
|---|---|---|---|
| 3,258,312 | 6/1966 | Olson | 436/1 |
| 3,406,501 | 10/1968 | Watkins | 55/316 |
| 4,272,480 | 6/1981 | Stull et al. | 436/1 X |
| 4,364,756 | 12/1982 | Clarke et al. | 55/316 |
| 4,382,440 | 5/1983 | Kapp | 55/316 X |
| 4,492,151 | 1/1985 | Mattei | 55/274 X |
| 4,553,992 | 11/1985 | Boissinot et al. | 55/279 |

Primary Examiner—Charles Hart
Attorney, Agent, or Firm—Anthony D. Cipollone

[57] ABSTRACT

An Air Treatment Unit providing a filtration system for removing ethylene oxide which comprises a blower unit for air intake (1), a top orifice (2) with a coil spring backing (3) attached to and having access to the front face of a coarse wire and fibrous filter element (4) behind which is a filter media made up of granular activated carbon impregnated with various metallic oxides of copper, silver and chrome in various proportions designed exclusively for the selective removal of ethylene oxide gases (5) and a bottom face with fine wire and a fibrous filter element (6) with an orifice to allow clean air out (8) these said faces being attached mechanically to enclose the filtering media in a leak-proof frame (7) with a circular glass viewer (9) to which is attached a gel which is color sensitive to ETO concentration of 0.3 ppm indicating replacement of the filter media (5).

2 Claims, 4 Drawing Figures

AIR TREATMENT UNIT PROVIDING A FILTRATION SYSTEM FOR REMOVING ETHYLENE OXIDE FROM A CONTAMINATED ENVIRONMENT

BACKGROUND OF THE INVENTION

1. Field of the Invention

This invention relates generally to the use of filtration devices to eliminate contaminates from the immediate environment which would adversely affect the health of an employee when exposed to this environment for use in an air pressurized/conditioner, such as used on work cabs.

The invention relates more particularly to the elimination of ethylene oxide specifically from a contaminated environment so that the immediate area surrounding the employee in an enclosed area would be free of ethylene oxide below government standards for harmful concentration.

2. Description of the Prior Art

Contaminated environment adversely affects the health of an employee when exposed to this environment. One such contaminate, ethylene oxide, is especially detrimental to the health of the employee. The U.S. Department of Labor Occupational Safety and Health Administration has a standard to protect workers exposed to ethylene oxide.

Various methods have been employed to protect the immediate environment to which an employee is exposed in industrial areas. U.S. Pat. No. 4,429,151 discloses an air pressurizer/conditioner especially for the driving cabs or tractors in polluted atmospheres comprising an air treatment unit mounted or incorporated in the roof of the cab. Generally speaking, a turbo fan is positioned donwstream from the various filters, and draws exterior airs through a vent, through the filters, and then forces it into the driving cab. The filter comprises one coarse filter for eliminate the solids, a fine filter for removal of dust, and an activated charcoal cell for stopping harmful gases and vapors.

In addition to the patent discussed above, the following patents apply:

U.S. Pat. No. 4,120,527, which discloses an improved vehicle cab structure providing controlled circulation of air through the operator compartment;

U.S. Pat. No. 4,469,490, which discloses a method and apparatus for filtering the air admitted to the cab of a vehicle which operates in a severe environment; and, U.S. Pat. No. 4,440,555, which discloses an air cleaner system for an internal combustion engine located in a vehicle engine compartment.

OBJECTS AND SUMMARY OF THE INVENTION

It is the object of this invention to provide a novel filtration system for use in the air treatment unit of an air pressurizer/conditioner mounted or incorporated in a cab to be used in an industrial area.

It is the further object of this invention to provide a filtration system which specifically eliminates ethylene oxide from the contaminated environment to levels far below required by OSHA standards by the use of a unique mixture of various metallic oxides impregnated in the granular activated carbon in the filter. It is this combination of oxides which is unique in properties and specific for the elimination of ethylene oxide.

It is this unique combination of oxides of copper, silver and chrome and the filtration system that provides, in large part, the unique properties of the filtration system which specifically removes ethylene oxide from the contaminated environment so effectively.

DETAILED DESCRIPTION OF THE INVENTION

Workers exposed to a contaminated environment over a period of time have suffered adverse health effects. In recent times, air pressurized/conditioner equipment with filtering devices have been applied to cabs for use in an industrial environment wherein such equipment is used to provide pressurizing in air purification equipment to efficiently filter harmful particles and organic constituents of harmful vapors and aerosols by means of an absorption phenomenon.

The present invention deals with the chemical properties of the chemical filter and the absorption media specifically designed for the absorption of ethylene oxide.

A forklift is provided with a cab to form a complete enclosure around the operator of the forklift. While the cab is not sealed, it is sufficiently air-tight so as to allow a blower to provide a continuous, positive air pressure within the cab so that any leaks are from the cab to the outside environment and not vice-versa. The fan is adapted to intake air from the outside of the cab and force it through a filter which removes contaminants. This allows the interior of the cab to remain contaminant free while the forklift is in a contaminated environment. In particular, it is desired that the filter be capable of removing ethylene oxide from the exterior air before it is forced into the interior of the cab. This will allow the forklift drivers to continue to perform their jobs even when the forklift must enter into areas with a level of ethylene oxide in the air is higher than the levels allowed by Government standards, in levels which may endanger the health of the driver.

The present invention deals with the special filters specifically designed to remove ethylene oxide in quantitites which exceed Government standards and the special composition of the oxides contained therein as part of the filter designed to remove ethylene oxide.

The filter unit itself takes the general form of a flattened cylinder which has on one of its front faces an air-intake area extending over the face to allow access to the front face of a coarse filter element to an area inside the box in a space filled with a specially designed filtering medium containing granular activated carbon impregnated with various metalic oxides. The impregnated activated carbon filtering media has been exclusively designed and impregnated with various combinations of the oxides of copper, silver and chrome in such proportion as to effectively remove all of the ETO gases which come into contact with the filtering medial below Government requirements.

Thereafter, the treated free air is forced through a fine mesh screen for removal of small particles and subsequently pushed out and delivered inside the cab. The unit is equipped with a chemical monitoring device for the detection of ethylene oxide which is a gel visible from a glass viewer. The gel indicates saturation of the unit by ethylene oxide at levels of 0.3 ppm by a change in color from yellow to green.

The design of the filter is such that the air flows once entered in the filter and leading into the cab are part of a leak-proof frame with a sealing gasket so that there is no leak once the air has entered the filtering device.

The mixtures of oxides remove the ethylene oxide and test results indicate that levels of ethylene oxide contamination in cabs are below Government standards.

The composition of the granular activated carbon impregnated with copper oxide, silver oxide and chrome oxide establish the unique properties of the filter in the filtration process and filter medium claimed in this invention.

| SAMPLE FORMULATION OF THE FILTER MEDIA MEDIA FORMULATION |
| --- |
| 95% Granular activated carbon |
| 5% Copper Metal Oxide |
| 2% Chrome Metal Oxide |
| 1% Silver Metal Oxide |

| TEST RESULTS GRIFFITH LABS | | |
| --- | --- | --- |
| | Outside Cab Readings | Inside Cab Readings |
| 5/9/85 | 33 ppm | .4 ppm |
| 5/10/85 | 337 ppm to 552 ppm | .28 ppm .19 ppm .20 ppm |
| 8/1/85 | 220 ppm + | .721 ppm |
| 8/2/85 | 250 ppm + | .4 ppm .8 ppm |
| 8/5/85 | 250 ppm + | .6 ppm |
| 8/7/85 | 300 ppm + | .6 ppm .8 ppm | fact of a course wire and fibrous filter element (9) behind which is a filtering media made up of granular activated carbon impregnated with various metalic oxides of copper, silver and chrome in various proportions designed exclusively for the selective removal of ethylene oxide gases (10) and a bottom face with a fine wire and fibrous filter element (11) with an oriface to allow clean air out (12) these said faces being attached mechanically to enclose the filtering media attached to a leakproof frame and bottom face with an orifice to allow clean air to be pushed out into the cab (5). On the face of the leakproof frame is a glass viewer (13) behind which is a gel which is sensitive to ETO concentrations and changes from yellow to green when the filtering media is saturated with ETO at 0.3 ppm.

Figure 1:
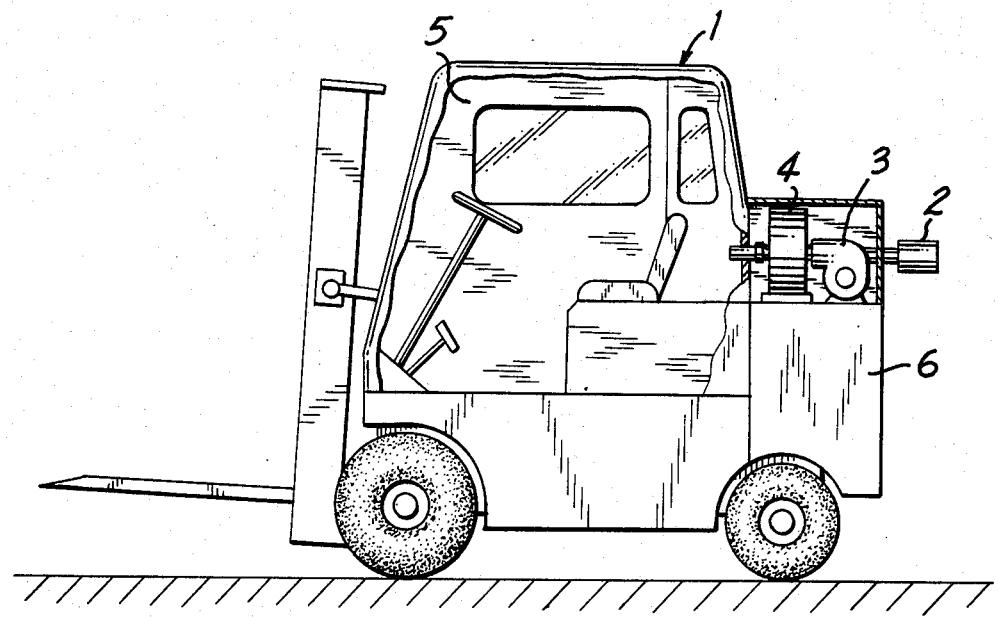

What is claimed is:

1. Removal air filter used as part of air treatment unit for use in a contaminated environment, comprising of a blower assembly for sucking in outside air and conveying it to removable air filter being equipped with a coarse filter element for removing solid particles, then being forced through a granular activated carbon media impregnated with metallic oxides for the specific removal of ethylene oxide vapors from the incoming air by absorption, and finally forcing the incoming air through a fine filter element for fine particle removal and conveying the filter free air to the enclosed environment, this air filter taking a flattened cylindrical form which has, on one of its faces an incoming polluted

| FORKLIFT OPERATOR QUARANTINE | ETO MONITORING | | | | | | | | | | | | | | |
| --- | --- | --- | --- | --- | --- | --- | --- | --- | --- | --- | --- | --- | --- | --- | --- |
| | | 6/4/85 | | | 6/5/85 | | | 6/7/85 | | | 6/10/85 | | | 6/11/85 | |
| Ed Dumont | L | Inner | 0.9 | L | Inner | 0.5 | R | Inner | 0.1 | R | Inner | 0.7 | R | Inner | 1.1 |
| | | Outer | 0.9 | | Outer | 0.5 | | Outer | 0.4 | | Outer | 0.6 | | Outer | 1.1 |
| | | | | | | | L | Inner | 0.1 | L | Inner | 0.9 | L | Inner | 0.9 |
| | | | | | | | | Outer | 0.3 | | Outer | 0.7 | | Outer | 0.9 |
| Outside Cab | | | | L | Front | 3.2 | R | Front | 2.7 | R | Front | 1.6 | R | Front | 2.4 |
| | | | | | | | L | " | 2.7 | L | " | 1.6 | L | " | 2.5 |
| | | | | | | | R | Back | 2.3 | R | Back | 1.6 | R | Back | 1.5 |
| | | | | | | | L | " | 2.5 | L | " | 1.6 | L | " | 0.6 |
| | | | | | | | R | Window | 2.6 | R | Window | 1.9 | R | Window | 2.5 |
| | | | | | | | L | " | 2.8 | L | " | 1.8 | L | " | 2.1 |
| Inside Cab | | | | | | | R | Front | 0.5 | R | Front | 0.0 | R | Front | 0.4 |
| | | | | | | | L | " | 0.8 | L | " | 0.0 | L | " | 0.4 |
| | | | | | | | R | Back | 0.8 | R | Back | 0.0 | R | Back | 0.7 |
| | | | | | | | L | " | 0.6 | L | " | 0.2 | L | " | 0.5 |
| | | | | | | | R | Window | 0.9 | R | Window | 0.2 | R | Window | 0.5 |
| | | | | | | | L | " | 0.8 | L | " | 0.3 | L | " | 0.6 |

IN THE DRAWINGS

FIG. 1 is a diagramatic view of the cab and air pressurizer/conditioner attachments, showing the main elements and the positioning of the filter, the subject of the present invention.

A heavy metal cab, (1), is equipped with an air-intake (2) attached to a blower (3) which sucks air into and towards the filter (4) and subsequently air is pumped into cab (5) which is monitored by the electrical controlled (6) to determine the quantity of ethylene oxide in the air which is being blown into the cab.

Figure 2:
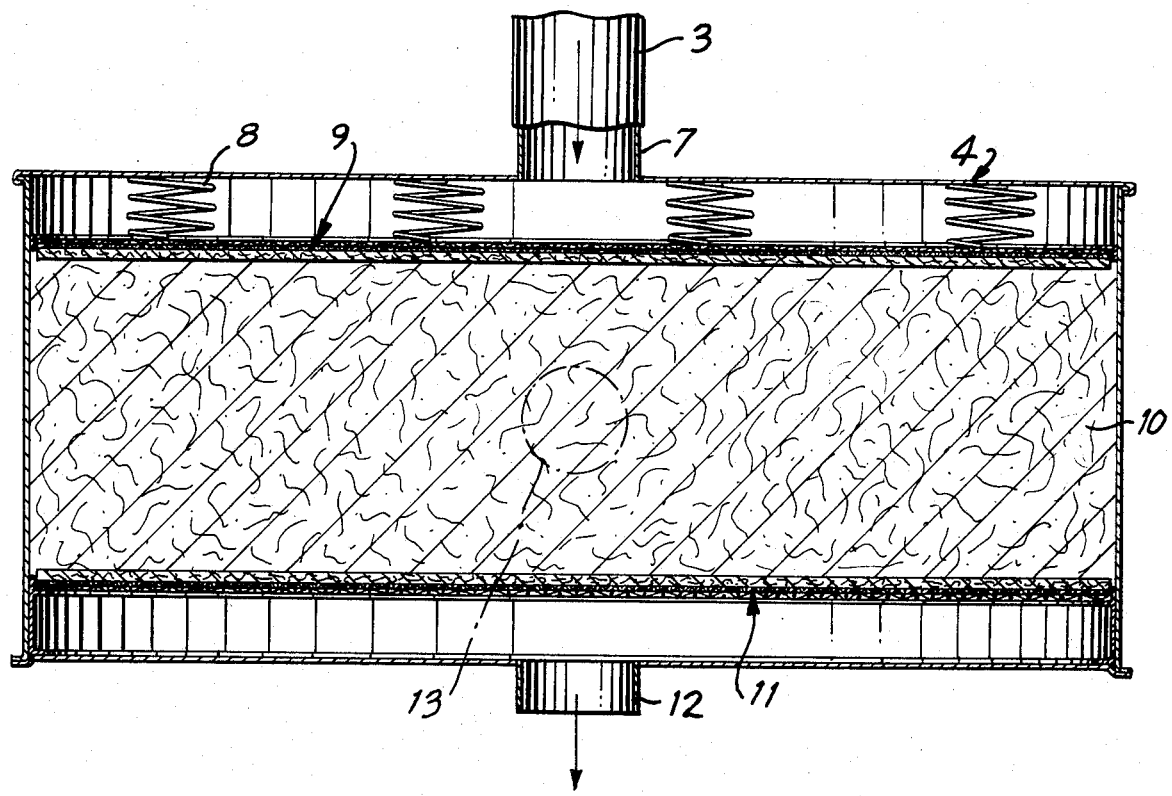
Figure 3:
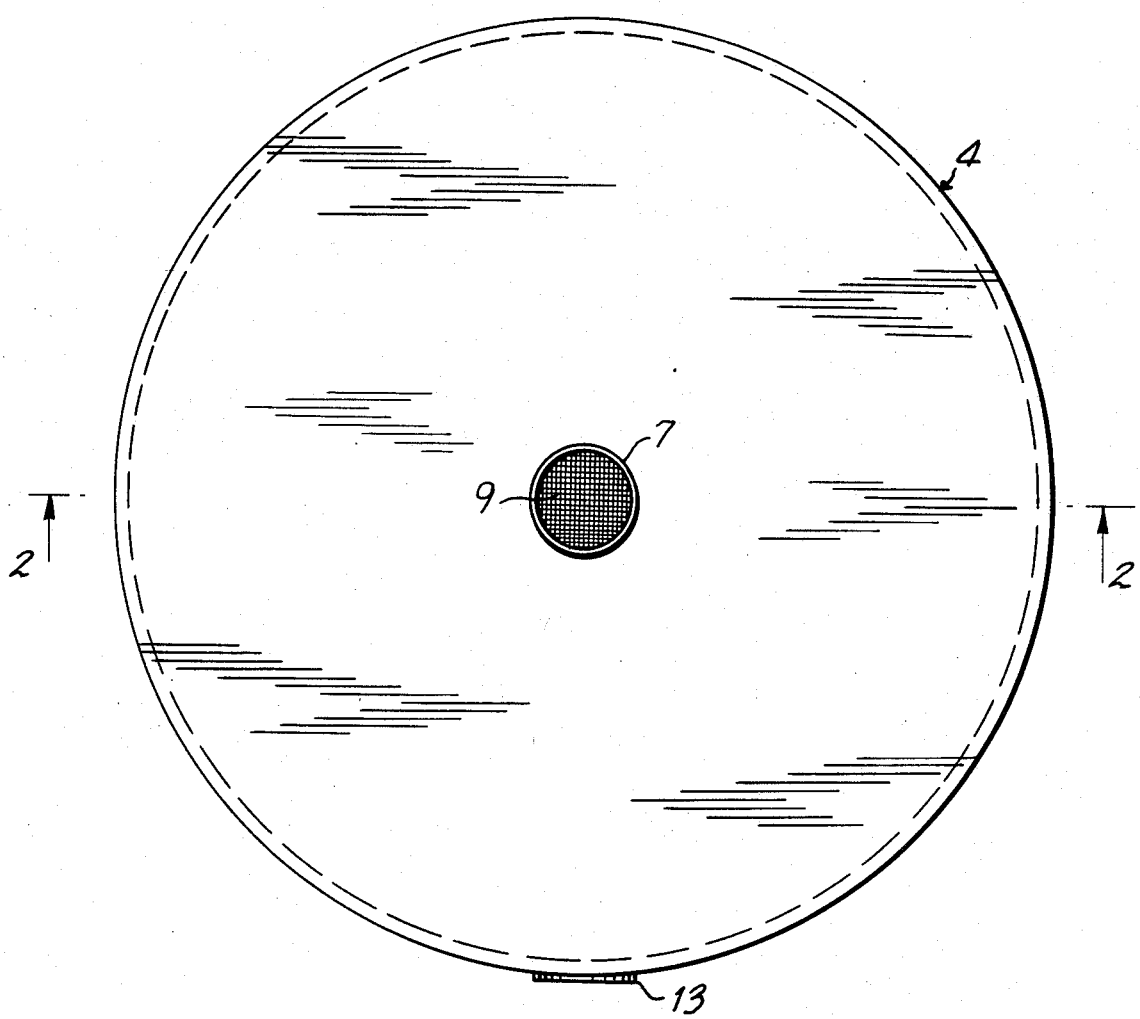
FIG. 3 is a top view of the filter assembly.
Figure 4:
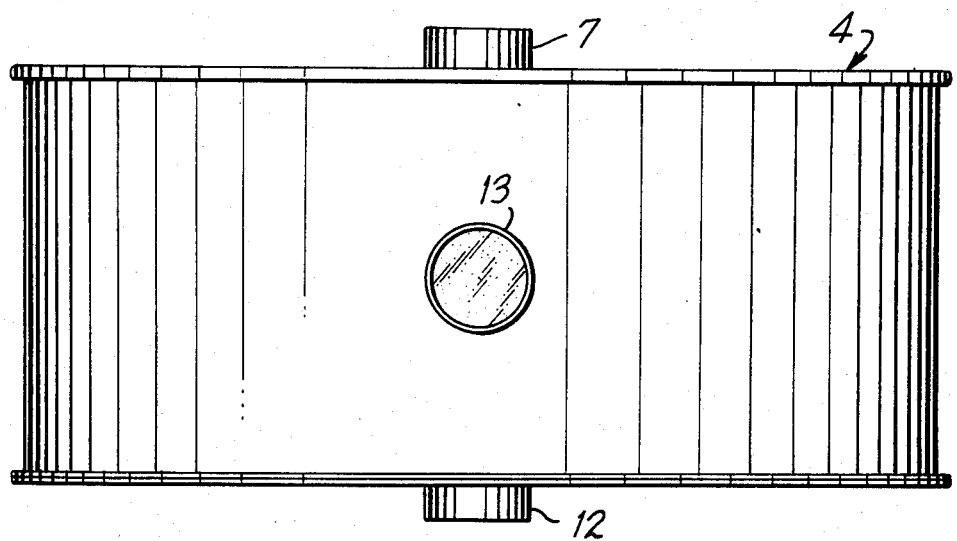
FIG. 4 is a front view of the filter assembly.

FIG. 2 is a detailed view of the filter showing the functional components of the filter.

Present is a blower for air-intake (7) which sucks in air to the top orifice of the filter (4) with a coiled spring backing (8) attached to and having access to the front air orifice to allow access to the coarse filter element on the front portion of the cylinder followed by the activated granular carbon media where the ethylene oxide is absorbed and finally forced through the face of the fine filter element, these faces being attached mechanically to a leak-proof frame with a blower assembly before the orifice to the coarse filter element so that the polluted air is forced through the said filter elements and absorption media to deliver purified air to the enclosed environment with an ethylene oxide detector for determining ETO saturation concentration of 0.3 ppm.

2. The removable air filter according to claim one wherein the metallic oxides of the granular activated carbon media impregnated with metallic oxides are a variable combination of copper, silver and chrome oxides specific for the absorption of ethylene oxide.

* * * * *